US008873923B2

United States Patent
Bartholomäus et al.

(10) Patent No.: US 8,873,923 B2
(45) Date of Patent: Oct. 28, 2014

(54) METHOD FOR MANUFACTURING AN OPTICAL FIBER SPOOL WITH SELF-SUPPORTING COIL OF AN OPTICAL FIBER AND OPTICAL FIBER SPOOL

(75) Inventors: Ralf Bartholomäus, Wedel (DE); Sönke Huckfeldt, Elmshorn (DE)

(73) Assignee: Atlas Elektronik GmbH, Bremen (DE)

( * ) Notice: Subject to any disclaimer, the term of this patent is extended or adjusted under 35 U.S.C. 154(b) by 408 days.

(21) Appl. No.: 13/413,795

(22) Filed: Mar. 7, 2012

(65) Prior Publication Data

US 2012/0230642 A1 Sep. 13, 2012

(51) Int. Cl.
G02B 6/00 (2006.01)
B23P 11/00 (2006.01)
G02B 6/44 (2006.01)
B65H 55/02 (2006.01)

(52) U.S. Cl.
CPC .......... *G02B 6/4457* (2013.01); *B65H 2701/32* (2013.01); *G02B 6/4486* (2013.01); *B65H 55/02* (2013.01)
USPC .......................................... 385/135; 385/139

(58) Field of Classification Search
USPC .................. 385/135, 136, 137, 139; 29/428; 356/460–465
See application file for complete search history.

(56) References Cited

U.S. PATENT DOCUMENTS 4,743,115 A * 5/1988 Arditty et al. ............... 242/445.1
4,781,461 A * 11/1988 Baron et al. .................. 356/465
4,856,900 A * 8/1989 Ivancevic ..................... 356/465
5,179,613 A * 1/1993 Cronk .......................... 385/128
5,205,890 A 4/1993 Darsey et al.
5,402,966 A 4/1995 von Hoessle
5,841,932 A * 11/1998 Page et al. .................... 385/134
5,917,983 A * 6/1999 Page et al. .................... 385/134
7,460,241 B2 * 12/2008 Heffner et al. ................ 356/465
2007/0206196 A1 * 9/2007 Heffner et al. ................ 356/465
2010/0301501 A1 12/2010 Brenner et al.
2012/0230642 A1 * 9/2012 Bartholomaus et al. ...... 385/134

FOREIGN PATENT DOCUMENTS

DE 3520195 A1 12/1986
DE 38 42 036 A1 6/1990

(Continued)

OTHER PUBLICATIONS

European Search Report dated Jul. 11, 2012, corresponding with European Application No. 12 157 144.2.

*Primary Examiner* — Akm Enayet Ullah
(74) *Attorney, Agent, or Firm* — Fitch, Even, Tabin & Flannery LLP

(57) ABSTRACT

A method for manufacturing an optical fiber spool includes winding a coil of an optical fibers up in the form of a cross-winding such that several layers of the optical fiber are formed that lie on top of one another. The optical fiber has a surface that respectively features contact areas between adjacent layers. Elevations are produced on the surface to create intermediate spaces between the elevations. The elevations are distributed so that in the region of one of the respective contact areas, at least one of the elevations of one of the adjacent layers of the respective contact area engages into at least one of the intermediate spaces of the other adjacent layer to of the same contact area. An optical fiber spool with a self-supporting coil of an optical fiber can be produced.

14 Claims, 3 Drawing Sheets

(56) References Cited

FOREIGN PATENT DOCUMENTS

| DE | 3842036 A1 | 6/1990 |
|---|---|---|
| DE | 4017337 A1 | 12/1991 |
| DE | 202 01 588 U1 | 3/2003 |
| EP | 0 546 259 A1 | 6/1993 |
| EP | 2 437 091 A1 | 4/2012 |
| GB | 1305690 A | 2/1973 |
| WO | 2009/036897 A1 | 3/2009 |
| WO | 2009036897 A1 | 3/2009 |

\* cited by examiner

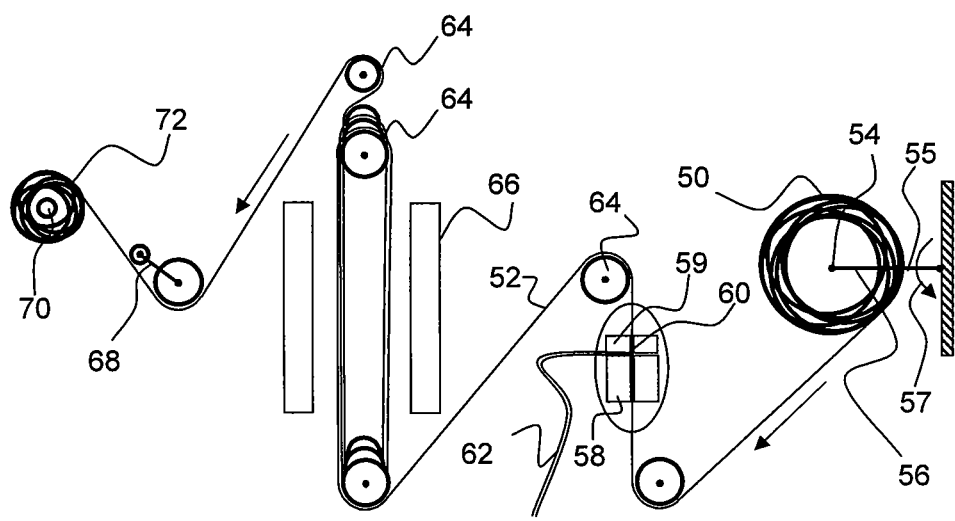
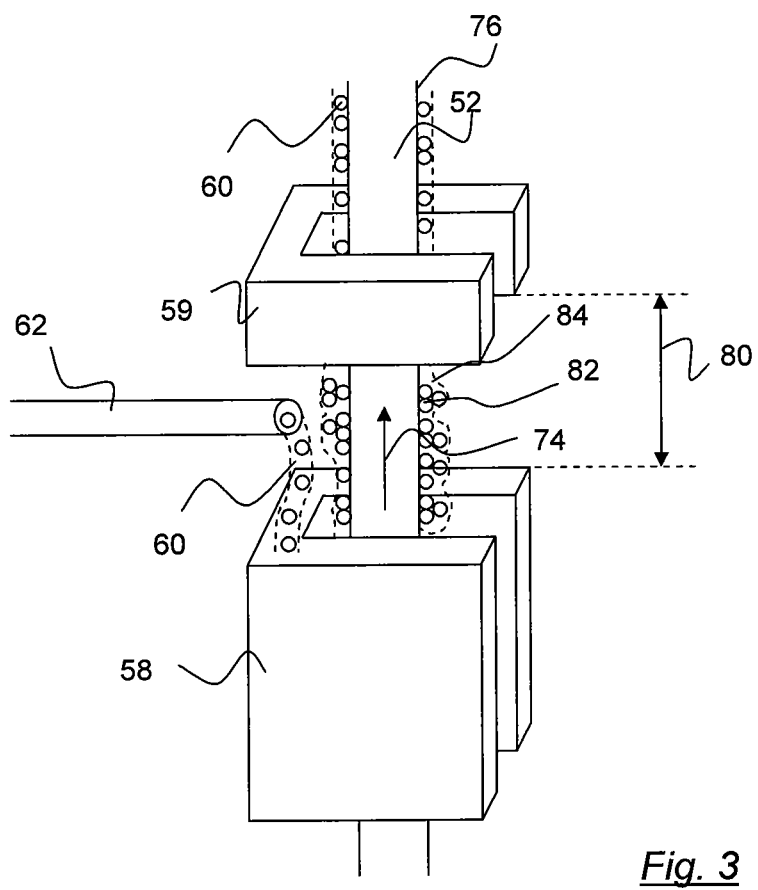

METHOD FOR MANUFACTURING AN OPTICAL FIBER SPOOL WITH SELF-SUPPORTING COIL OF AN OPTICAL FIBER AND OPTICAL FIBER SPOOL

CROSS-REFERENCE TO RELATED APPLICATIONS

The present application claims the priority of German Patent Application No. 10 2011 013 309.7, filed Mar. 7, 2011, the subject matter of which, in its entirety is incorporated herein by reference.

BACKGROUND OF THE INVENTION

The invention pertains to a method for producing an optical fiber spool with a self-supporting coil of an optical fiber according to the preamble of Claim 1, as well as to an optical fiber spool with a self-supporting coil of an optical fiber according to the preamble of Claim 10.

WO2009/036897 A1 discloses a self-supporting optical fiber spool and a method for its production, wherein the optical fiber spool consists of a coil with layered windings of an optical fiber that can be unwound from the interior of the coil. The optical fiber serves for transmitting information between a submarine and a vehicle launched by the submarine such as, e.g., a homing torpedo. In order to provide the optical fiber spool with sufficient stability for maintaining its shape in a self-supporting fashion, the coil of the optical fiber spool is wound up in the form of a cross-winding, wherein the windings of a layer of the optical fiber and the windings of adjacent layers of the optical fiber are fixed on one another by means of an adhesive or adherent binder.

Furthermore, DE 35 20 195 A1 discloses a packaging of cross wrapped layers of a fiber optic. The turns of the fiber optic are connected with each other with an adhesive at least partially. The turns can be displaced by applying a drag force to the fiber optic. Moreover, D1 discloses a method for producing the packaging. In the production an adhesive is applied prior to the winding process of the packaging.

DE 40 17 337 A1 discloses a self-supporting fiber optic coil. Prior to the winding process of the coil, a thermoplastic adhesive is applied to allow the self-supporting of the coil. The particularity of the thermoplastic adhesive is that it is porous and brittle, resulting in a high unwinding speed of the fiber optic cable because of the easy fracturing of the bonded layers.

DE 38 42 036 A1 discloses an optical fiber coil which is self-supporting and in cross winding. Furthermore, the fiber optic is surrounded by a jacket that enables the self-supporting of the coil without an adhesive. Therefore, the jacket is formed by a soft plastic material forming a widened, flattened cross-sectional contour at cross-over points. Furthermore, it is shown to surround the optical fiber with a more rigged plastic with a gel-like intermediate layer between the jacket and the fiber optic. Also, it is disclosed that the jacket has a coefficient of friction, which lies above a value of 0.3. This coefficient of friction results in a self-supporting without adhesive coating.

U.S. Pat. No. 5,179,613 A discloses a method for producing a coil of a fiber optic. In the production the fiber optic is made adherent before winding the coil. For this purpose, it is disclosed that an adhesive is dried after it is applied onto the optical fiber. Before winding, the adhesive is "activated", in example by heating with a flame.

GB 1 305 690 A shows a self-supporting coil of an insulated electrical conductor whose turns are bounded together to achieve the self-supporting. Furthermore, it is disclosed that the insulation comprises cavities or tranches along its longitudinal axis. Along these cavities or tranches, an adhesive can be moved in the spaces between the turns of the winding. As a bounding agent, a water-based emulsion is disclosed.

In order to transmit information between a submarine or launching platform and a vehicle launched by the submarine or launching platform such as, e.g., a torpedo or an underwater vehicle, the optical fiber is stored in the form of an optical fiber spool in the vehicle, as well as in a so-called cassette that remains on the submarine or on the launching platform. After the vehicle has been launched by the submarine or the launching platform, information is already transmitted through the optical fiber while the optical fiber spool is unwound from the inside toward the outside. The optical fiber spool is wound up in the form of a cross-winding in order to ensure the simple and reliable unwinding thereof. Due to the high unwinding speeds of the optical fiber spool, the simple and reliable unwinding thereof is absolutely imperative for preventing the optical fiber spool from tearing while it is unwound. During the manufacture of the optical fiber spool, the optical fiber spool is wound onto a winding mandrel that needs to be removed after the wind-up process in order to make it possible to unwind the optical fiber spool from the inside toward the outside. The optical fiber spool needs to maintain its shape in a self-supporting fashion after the winding mandrel has been removed.

In the prior art, a gel-like filler or saturant is applied on the optical fiber or individual windings of the optical fiber spool during the wind-up thereof, wherein the filler or saturant is heated referred to the room temperature and solidifies when it cools. It is furthermore known to immerse the optical fiber spool in a dipping bath together with the winding mandrel remaining therein, wherein this dipping bath also consists of a filler or saturant that is heated referred to the room temperature and therefore liquefied. In both instances, cooling of the optical fiber spool results in the filler or saturant being transformed into a gel-like state such that the individual windings or layers of the optical fiber spool adhere to one another and the optical fiber spool therefore maintains its shape in a self-supporting fashion.

In this case, one encounters the problem that the filler or saturant may disperse during the cooling process such that a higher or lower bonding strength or adhesive strength than that required for a reliable unwinding process is produced between the individual layers or individual windings of the optical fiber. If the adhesive force is excessively high, individual layers or individual windings of the optical fiber adhere to one another so solidly that a winding being unwound at a certain time during the high-speed unwinding of the optical fiber already tears along one or more windings from a layer of the optical fiber that should not be unwound until a later time.

Windings that are torn along in this fashion may cause the optical fiber to become knotted and/or sharply bend such that the optical fiber gets stuck, e.g., in the cassette in the submarine or launching platform and is subjected to such a tension that the optical fiber tears as the distance between the submarine or launching platform and the vehicle launched by the submarine or launching platform, e.g., a torpedo or underwater vehicle, increases.

The invention therefore is based on the objective of disclosing a method for manufacturing an optical fiber spool, as well as an optical fiber spool, in which another winding that adheres to the winding currently being unwound with an excessively high adhesive strength is prevented from being torn along.

SUMMARY OF THE INVENTION

According to the invention, this objective is attained with the characteristics of a method for manufacturing an optical fiber spool with a self-supporting coil of an optical fiber according to claim 1, as well as the characteristics of an optical fiber spool with a self-supporting coil of an optical fiber according to Claim 10.

According to the invention, the inventive method for manufacturing an optical fiber spool, as well as the optical fiber spool, is realized such that a simple and reliable unwinding of the optical fiber its insured in that the layers of the optical fiber are statically fixed in position.

To this end, the invention proposes a method for manufacturing an optical fiber spool with a self-supporting coil of an optical fiber. During the manufacture, the coil of the optical fiber is wound up in the form of a cross-winding such that the coil is composed of several layers of the optical fiber that lie on top of one another. The wind-up in the form of a cross-winding results in contact areas between adjacent layers of the optical fiber that lie on top of one another.

The optical fiber has a surface, on which elevations are applied or on which elevations are produced. In this case, the elevations consist, e.g., of a material that is applied on the surface. Partial accumulation of the material then partially produces the elevations that are respectively fixed in position on the surface of the optical fiber spool such that they are largely immovable, at least by the usually predominant forces within an optical fiber spool. The elevations being applied or produced create intermediate spaces between the elevations. In this context, the intermediate spaces consist of the regions or positions on the surface, in which no elevations were applied on the surface. In this case, the elevations are distributed over the surface of the optical fiber in such a way that, in the region of one of the respective contact areas, at least one of the elevations of one of the adjacent layers of the respective contact area engages into at least one of the intermediate spaces of the other adjacent layer of the same contact area. In other words, the surface of the optical fiber is roughened or the coefficient of friction of the surface is increased by the partially distributed elevations in such a way that the rough surfaces of the adjacent layers engage into one another within the contact areas.

Consequently, exactly two adjacent layers of the optical fiber contact one another in a contact area. In the region of the contact areas of the two contacting optical fibers, the surface of the optical fiber features elevations and intermediate spaces between the elevations. This means that the surface is rough or has a relatively high coefficient of friction in comparison with a surface without elevations. In this region of the respective contact area, the elevations of one of the two layers engage into the intermediate spaces between the elevations of the other layer. The layers therefore engage into one another. In this case, one elevation or several elevations on the surface of one of the adjacent layers in the contact area may engage into one or more intermediate spaces between the elevations on the surface of the other adjacent layer in the same contact area.

The invention furthermore pertains to an optical fiber spool with a self-supporting coil of an optical fiber. The coil is realized in the form of a cross-winding such that the coil features several layers of the optical fiber that lie on top of one another. The optical fiber spool has contact areas between two adjacent layers of the layers lying on top of one another. Consequently, a contact area is defined as the area, in which two adjacent layers of the optical fiber or two adjacent windings of two adjacent layers of the optical fiber contact one another.

The optical fiber of the optical fiber spool has a surface that features elevations and intermediate spaces between the elevations. Consequently, the surface of the optical fiber spool is rough or has a high coefficient of friction in comparison with a conventional surface of an optical fiber. In this case, the elevations are distributed in such a way that, in the region of one of the respective contact areas, at least one of the elevations of one of the adjacent layers of the respective contact area engages into at least one of the intermediate spaces of the other adjacent layer of the same contact area. The roughness is therefore realized such that adjacent layers of the surface of the optical fiber engage into one another or intermesh.

The advantage of the method for manufacturing an optical fiber spool, in which elevations are produced or applied on the surface of the optical fiber, and of an optical fiber spool with an optical fiber that features elevations on the surface can be seen in that the optical fiber spool maintains its shape in a self-supporting fashion, namely even if no winding mandrel remains therein and no adhesive or filler/saturant is required for fixing the individual windings or layers of the optical fiber on one another.

During the unwinding process, windings that should not yet be unwound at a certain time are not torn along because they adhere to the winding being unwound at the time with an excessively high adhesive strength. The optical fiber is hereby prevented from tearing while it is unwound and a reliable and simple unwinding of the optical fiber can be achieved.

Since the elevations and intermediate spaces of the individual windings of adjacent layers of the optical fiber engage into one another, the specific positions of the windings defined for a cross-winding are already prevented from shifting during the wind-up process. The individual windings or layers of the optical fiber also can no longer shift or be displaced after the optical fiber spool is completed or on the optical fiber spool itself.

According to another advantageous additional development of the method for manufacturing an optical fiber spool, the elevations are formed with a material that attaches to the surface of the optical fiber, in particular, by means of adhesion. In other words, the material adheres directly to the surface of the optical fiber and forms the elevations. One suitable material, for example, is a dispersion such as, e.g., a suspension or emulsion.

According to an additional development of the inventive optical fiber spool, the elevations are also formed on the surface of the optical fiber with a material that attaches to the surface of the optical fiber, in particular, by means of adhesion.

A material for forming the elevations that directly attaches to the surface of the optical fiber, e.g., by means of adhesion has the advantage that no additional adhesive or no additional binder needs to be applied on the surface of the optical fiber during the manufacture in order to form the elevations.

According to another advantageous additional development of the method for manufacturing an optical fiber spool, the elevations are produced or applied on the surface of the optical fiber by applying or distributing a dispersion with liquid and solid fractions on the surface of the optical fiber and desiccating or evaporating the liquid fraction of the dispersion. After desiccating or evaporating the liquid fraction, only the solid fraction of the dispersion remains on the surface of the optical fiber and forms the elevations thereon. A dispersion may consist, e.g., of a suspension with a solid and a liquid fraction or an emulsion with a liquid fraction and a mixture of a solid and a liquid fraction.

The application of the elevations on the surface of the optical fiber by means of a dispersion with a liquid fraction has the advantage that dispersions with a liquid fraction can be easily applied on the surface of the optical fiber prior to the wind-up process.

According to another advantageous additional development of the inventive method for manufacturing an optical fiber spool, the dispersion is applied on the surface of the optical fiber in that the optical fiber grazes a first means that is saturated with the dispersion. For example, the optical fiber is pulled through a first means that is saturated with the dispersion or passes through a slot or a hole in the first means, e.g., a sponge that is saturated with the dispersion, wherein the dispersion at least partially adheres slightly to the optical fiber while it passes through the saturated means, i.e., the saturated sponge. It is furthermore advantageous if the optical fiber subsequently grazes a non-saturated second means such as, e.g., a second sponge or extends through a slot or a hole in this second means in order to strip off excess dispersion applied thereon.

It is furthermore possible to apply the dispersion on the surface of the optical fiber by electrically charging the optical fiber and the dispersion with opposite polarity. If the dispersion is then atomized in the region of the optical fiber, the optical fiber attracts the dispersion such that it deposits on the surface thereof.

The advantage of applying the dispersion on the surface of the optical fiber in that the optical fiber grazes a saturated first means and/or the optical fiber and the dispersion attract one another due to an electrical charge can be seen in that a uniform distribution of the dispersion on the optical fiber is achieved. It is also possible to regulate the quantity of the dispersion to be applied on the optical fiber by regulating the degree of saturation of the saturated first means, i.e., by regulating the quantity of the dispersion supplied for saturating the first means in relation to the speed of the optical fiber grazing or passing through said means, or by regulating the intensity of the electric charge, respectively. A distribution of the elevations on the surface of the optical fiber that essentially is precisely defined can be achieved in this way.

According to another advantageous additional development of the inventive method, the outer phase of the dispersion is desiccated or evaporated in that the optical fiber is routed through at least one thermal element once or several times, i.e., the optical fiber passes through the thermal element. This means that the optical fiber is routed through one or more thermal elements such as, e.g., radiant heaters or other heat-radiating devices after the dispersion has been applied on the surface of the optical fiber. In this case, the optical fiber may be routed or pass through the same thermal element or several thermal elements once or several times. The optical fiber passes through the thermal element or the thermal elements until the liquid fraction of the dispersion is completely evaporated and only the solid fraction remains on the surface of the optical fiber in the form of elevations.

The advantage of evaporating or desiccating the liquid fraction of the dispersion by means of thermal elements can be seen in that a fast drying process is ensured such that the optical fiber with the elevations remaining on the surface thereof can be wound up into an optical fiber spool in the next step.

According to another advantageous additional development of the method for manufacturing an optical fiber spool, the dispersion is prepared in a water-based fashion. The dispersion therefore corresponds to a substance or a mixture, the main component of which is water.

The advantage of a water-based dispersion can be seen in that it does not attack the surface of the optical fiber or the optical fiber itself as it would be the case, e.g., with acidic dispersions. If the surface would be attacked, i.e., if the structure of the surface or of the optical fiber itself would be destroyed, the light pulses being transmitted in the optical fiber may be incorrectly reflected and therefore lead to errors in the transmission of information.

According to another advantageous additional development of the method for manufacturing the optical fiber, the solid fraction of the dispersion is prepared in a plastic-based fashion. The solid fraction of the dispersion, i.e., the fraction of the dispersion that remains on the surface of the optical fiber in the form of elevations after the evaporation of the liquid fraction, may also be prepared in a plastic-based fashion, e.g., due to the addition of additives.

The preparation of the solid fraction of the dispersion in a plastic-based fashion provides the advantage that the properties of the elevations such as, e.g., their rigidity and shape can be well predefined. One property of plastics that are prepared, in particular, due to the addition of additives is that their shape and their other properties can be adequately adapted to the respective requirements.

According to another advantageous variation of the inventive method for manufacturing the optical fiber spool, the optical fiber is subjected to a tensile force during the wind-up process, wherein this tensile force is dependent on the type of dispersion and the layer to be currently wound. Beginning with the first or inner layer, the tensile force is reduced for each additional or outer layer of the optical fiber and maintained constant while a layer is wound up. The tensile force is furthermore dependent on the material and the distribution of the dispersion, wherein it is also necessary to take into account, e.g., the distribution of the elevations, the rigidity and the shape of the solid fraction of the dispersion, i.e., the elevations on the surface of the optical fiber, in this respect. Consequently, the tensile force needs to be chosen such that a sufficient number of elevations of one layer of the optical fiber engage into or intermesh with the intermediate spaces of the other layer in the contact areas.

According to another advantageous additional development of the inventive optical fiber spool, the windings of the optical fiber also have a tension that is dependent on the material and the distribution of the dispersion, as well as the respective layer of the optical fiber, in each layer of the optical fiber spool.

The advantage of subjecting the optical fiber to a tensile force during the wind-up process or of using this tensile force for providing the layers of the windings of an optical fiber with a tension that is dependent on the material and the distribution of the dispersion, as well as on the layer to be wound or being wound, can be seen in that the outer layers exert increasing pressure upon the inner layers from the inside toward the outside due to the increasing diameter of the optical fiber spool such that the optical fiber spool would collapse after the removal of the winding mandrel, but this pressure increase is largely minimized by reducing the tensile force. If the material and the distribution of the dispersion are also taken into account when choosing the appropriate tensile force, the properties of the dispersion, i.e., of the elevations, ensure that the elevations and the intermediate spaces correctly engage into one another within the contact areas such that the optical fiber spool maintains its shape in a self-supporting fashion after the removal of the winding mandrel.

According to another advantageous variation of the method for manufacturing an optical fiber spool, each layer is wound up in the form of windings and the optical fiber is turned in itself within each of the windings during the wind-up process.

According to another advantageous additional development of the optical fiber spool, the optical fiber spool also consists of an optical fiber that is turned in itself within each winding.

In this context, a winding refers to the optical fiber being wound around an imaginary cylinder jacket, wherein the starting point and the end point of the winding lie on a straight line that extends parallel to the longitudinal spool axis on the cylinder jacket. The optical fiber is turned in itself within each winding of the optical fiber. In other words, the optical fiber is turned by 360 degrees about a longitudinal axis that extends through the center of the optical fiber between the starting point and the end point of each winding of the optical fiber.

In a viewing direction from the end of the optical fiber to be subsequently unwound along its longitudinal axis, the direction, in which the optical fiber is turned or twisted in itself, is defined as a rotation of the optical fiber about its longitudinal axis from this viewing direction. In this case, the direction, in which the optical fiber is turned (twisted) in itself, depends on the unwinding direction, i.e., the axial direction of the optical fiber spool, in which the optical fiber spool should be unwound. The direction, in which the optical fiber is turned in itself, furthermore depends on whether the optical fiber is intended for being unwound in the clockwise or counter-clockwise direction, wherein this unwinding is viewed opposite to the withdrawal direction. Consequently, the optical fiber is also turned (twisted) in itself in the direction, in which the optical fiber will subsequently unwind—viewed opposite to the withdrawal direction.

The advantage of pre-twisting or turning the optical fiber in itself can be seen in that no loops are created while the optical fiber is unwound and the optical fiber is twist-free after the unwinding or withdrawal process, wherein the risk of tearing the optical fiber would otherwise have to be accepted.

Other advantageous embodiments result from the dependent claims, as well as exemplary embodiments that are illustrated in the attached drawings and described in greater detail below.

BRIEF DESCRIPTION OF THE DRAWINGS

FIG. 2 shows a device for manufacturing an exemplary embodiment of the inventive optical fiber spool.

FIG. 3 shows a first means that is saturated with a dispersion and grazed by the optical fiber or through which the optical fiber passes, as well as a second means that strips excess dispersion off the surface of the optical fiber.

DETAILED DESCRIPTION OF THE INVENTION

Figure 1:
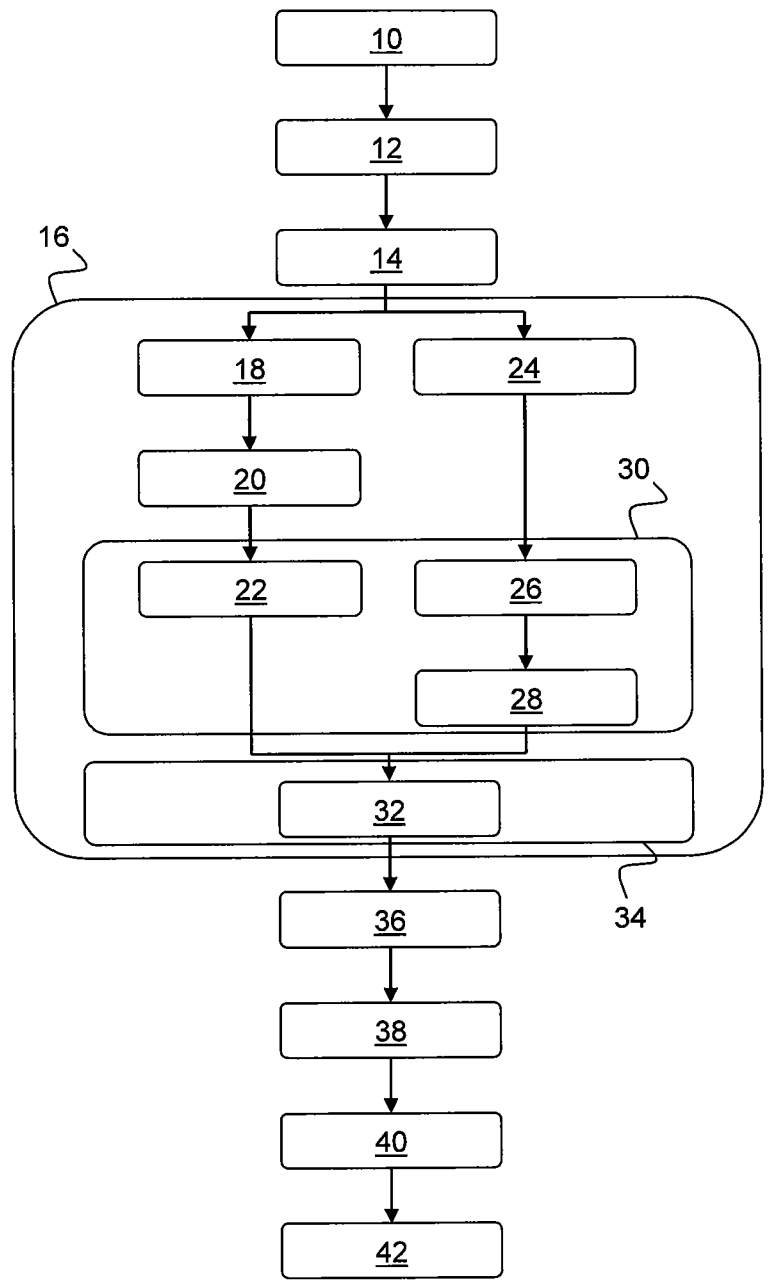
FIG. 1 shows the sequence of a method for manufacturing an optical fiber spool according to an exemplary embodiment of the invention.

FIG. 1 shows the sequence of a method for manufacturing an optical fiber spool with a self-supporting coil of an optical fiber according to an exemplary embodiment of the inventive method. In this case, a dispersion such as, e.g., a suspension is initially prepared 10 by preparing 10 a mixture of a solid fraction and a liquid fraction. In this context, the term dispersion refers to a mixture of a solid and a liquid fraction, wherein the solid fraction, namely the inner phase, is distributed in the liquid fraction, namely the outer phase. The inner phase is also referred to as disperse phase and the outer phase is also referred to as continuous phase. The inner phase is preferably prepared in a plastic-based fashion and the outer phase is preferably prepared in a water-based fashion. Although the preparation 10 of the dispersion is described at the beginning of the method for manufacturing an optical fiber spool, it may also be carried out at a later time in the ensuing sequence, but needs to be completed before the dispersion is used.

After the preparation 10 of the dispersion, the optical fiber is turned 12 in itself. For this purpose, a supply spool with the optical fiber is turned transverse to an axis through the supply spool. The optical fiber is unwound 14 from the supply spool while it is turned 12 in itself. Subsequently, elevations are produced 16 on the optical fiber. Two different options are available for producing these elevations. According to the first option, the dispersion and the optical fiber are charged 18 with opposite polarization. The dispersion is subsequently atomized 20 and delivered 22 into the vicinity of the optical fiber. According to the second option, a first means such as, e.g., a sponge is saturated 24 with the dispersion and the optical fiber subsequently grazes 26 the first means. The optical fiber subsequently grazes a second means that also consists, e.g., of a sponge, but is not saturated with the dispersion. Excess dispersion is stripped off 28 while the optical fiber grazes the second means. The delivery 22 of the dispersion into the vicinity of the optical fiber, as well as the grazing 26 of a first means by the optical fiber and the stripping 28 with a second means, serves for distributing 30 the dispersion on the optical fiber. After the distribution 30 of the dispersion on the optical fiber, the optical fiber is routed 32 through thermal elements, in which the liquid fraction of the dispersion is desiccated or evaporated 34.

After the production 16 of the elevations on the surface of the optical fiber, intermediate spaces are created 36 between the elevations. Subsequently, the optical fiber is subjected 38 to a tensile force and the coil is wound up 40 in the form of a cross-winding.

Layers of the optical fiber that lie on top of one another are created due to the production 16 of the elevations, as well as the creation 36 of the intermediate spaces and the wind-up 40 in the form of a cross-winding, wherein the elevations are produced 16 in such a way that the elevations and intermediate spaces of adjacent layers engage into one another 42 in contact points.

FIG. 2 shows a device for carrying out an exemplary embodiment of the inventive method for manufacturing an exemplary embodiment of the inventive optical fiber spool. For this purpose, a supply spool 50 that carries an optical fiber 52 and has an axis 54 extending through the center of the supply spool 50 is mounted on a suspension 56 of the supply spool 50 with a second axis 55 in such a way that the suspension 56 of the supply spool 50 can be turned about the second axis 55 in the direction of the arrow 57 and the supply spool 50 therefore can be turned transverse to the axis 54 through the center of the supply spool 50. The optical fiber 52 is unwound 14 by turning the supply spool 50 about the axis 54 through the center of the supply spool 50. The optical fiber 52 is turned 12 in itself by turning the supply spool 50 about the second axis 55 and therefore transverse to the axis 54 through the center of the supply spool 50. The optical fiber 52 passes through or grazes 26 a first means 58 that is saturated 24 with a dispersion 60. The saturation 24 of the first means 58 that consists, e.g., of a sponge is realized by supplying the dispersion 60 to the first means 58 via a supply line 62. After grazing 26 the first means 58, the optical fiber 52 passes through or grazes a non-saturated second means 59 that also consists, e.g., of a sponge and strips off 28 excess dispersion 60. Subsequently, the optical fiber 52 is routed 32 through at least one or more thermal elements or thermal heating elements 66 in order to evaporate 34 the liquid fraction of the dispersion 60. The optical fiber 52 is then routed to a tensioning roller 68 that can increase or decrease the tension of the optical fiber and therefore subjects 38 the optical fiber to a defined tensile force via deflection rollers 64 and wound onto a winding mandrel 70. In this case, the optical fiber 52 is wound up 40 into an optical fiber spool 72 on the winding mandrel 70 in the form of a cross-winding. For this purpose, the tensioning roller 68 is moved back and forth along a line extending parallel to the axis of the winding mandrel 70.

FIG. 3 shows the first means 58 that is saturated 24 with the dispersion 60 supplied via the supply line 62. In this case, the optical fiber 52 grazes 26 or passes through the first means 58 from the bottom toward the top in the direction of the arrow 73. The optical fiber 52 grazes 26 the first means 58 such that the dispersion 60 is distributed 30 over the surface 76 of the optical fiber 52. The optical fiber 52 furthermore passes through the second means 59 that is not saturated with the dispersion 60, wherein excess dispersion 60 remains in the second means 59, i.e., is stripped off 28 by the second means, and a uniform distribution of the dispersion 60 over the surface 76 of the optical fiber 52 is achieved. The first means 58 and the second means 59 are separated by an intermediate space 80, in which the dispersion 60 is supplied via the supply line 62. After the optical fiber passes through the second means 59, a solid fraction 82 of the dispersion 60, as well as a liquid fraction 84 of the dispersion 60, remains on the surface 76 of the optical fiber 52. Instead of using a first means 58 and a second means 59 that is separated from the first means 58, it would also be conceivable to use a single means such as, e.g., a sponge that merely features an opening for supplying the dispersion 60. In order to provide a better overview, FIG. 3 also shows a large slot that laterally extends through the first means 58 and the second means 59 and through which the optical fiber 52 is "threaded" into the first means 58 and the second means 59. This slot is usually much narrower such that the first means 58 and the second means 59 in essence completely enclose the optical fiber 52.

Figure 4:
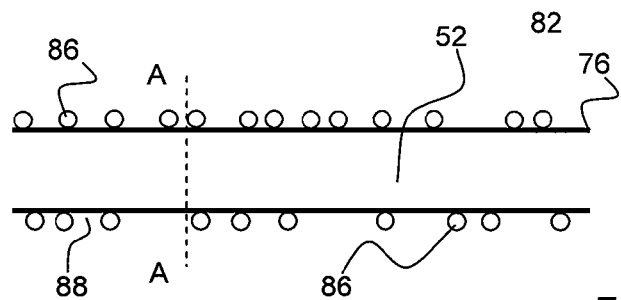
FIG. 4 shows an optical fiber with elevations produced on the surface thereof and thusly created intermediate spaces.

FIG. 4 shows the optical fiber 52 after it has passed 32 through the thermal elements or the thermal heating elements 66 and the liquid fraction 84 of the dispersion 60 has been evaporated 34. Only the solid fraction 82 of the dispersion 60 remains on the surface 76 of the optical fiber 52. In this way, elevations 86 are produced 16 and intermediate spaces 88 are created 36 between the elevations 86. The elevations 86 consist of a material that attaches to the surface 76 of the optical fiber 52 due to adhesion.

Figure 5:
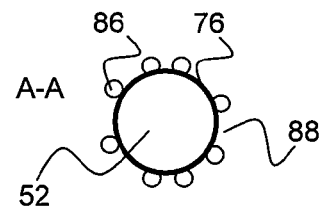
FIG. 5 shows the cross section through the optical fiber according to FIG. 4.

FIG. 5 shows the cross section A-A through the optical fiber 52 according to FIG. 4, wherein elevations 86 were produced 16 on the optical fiber 52 shown and intermediate spaces 88 were created 36 between the elevations.

Figure 6:
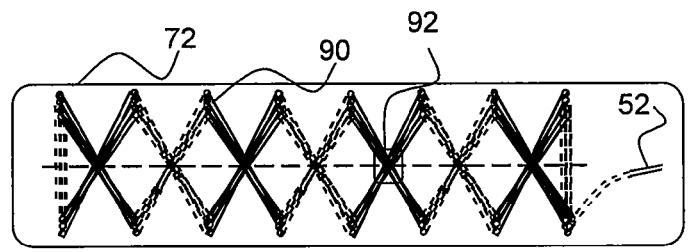
FIG. 6 shows an optical fiber spool with a self-supporting coil of an optical fiber.

FIG. 6 shows an optical fiber spool 72 with a self-supporting coil 90 of an optical fiber 52. In this case, contact areas 92 are created between the optical fiber layers that lie on top of one another.

Figure 7:
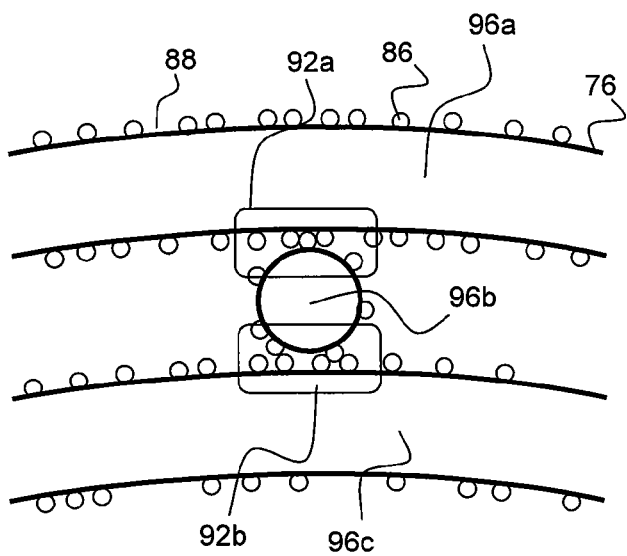
FIG. 7 shows a detail of a sectional plane of an exemplary embodiment of the optical fiber spool.

FIG. 7 shows layers 96a to 96c of the optical fiber 52 that lie on top of one another. Each of the layers 96a to 96c of the optical fiber 52 features elevations 86, as well as intermediate spaces 88 between the elevations 86. Due to the wind-up 40 in the form of a cross-winding, contact areas 92a, 92b are respectively created between the adjacent layers 96a, 96b and 96b, 96c. Within these contact areas 92a, 92b, the elevations 88 on the surface 76 of the optical fiber 52 engage 42 into the intermediate spaces 88 of the respective adjacent layers 96a to 96c.

For example, an elevation 86 of the layer 96b illustrated in the upper contact area 92a exactly engages into an intermediate space 88 between two elevations 86 of the layer 96a of the optical fiber 52. However, it would also be conceivable that two or more elevations 86 engage 42 into an intermediate space 88 of an adjacent layer 96a to 96c of the optical fiber. It would furthermore be conceivable that the elevations 86 do not completely engage 42 into the intermediate spaces 88 of an adjacent layer 96a to 96c, but that only part of the elevation 86 or elevations 86 engages 42 into an intermediate space 88.

According to another exemplary embodiment of the inventive optical fiber spool 72, this spool serves for transmitting data and information between a submarine and a vehicle launched by the submarine, e.g., a homing torpedo.

All characteristics disclosed in the preceding description of the figures, the claims and the introduction of the description can be used individually, as well as in any combination. Consequently, the disclosure of the invention is not limited to the described or claimed combinations of characteristics. On the contrary, all combinations of characteristics should be considered as being disclosed.

What is claimed is:

1. A method for manufacturing an optical fiber spool with a self-supporting coil of an optical fiber, wherein the coil is wound up in the form of a cross-winding such that the coil is formed with several layers of the optical fiber that lie on top of one another, and wherein the optical fiber has a surface and the optical fiber spool respectively features contact areas between adjacent layers of the layers lying on top of one another, wherein elevations are produced on the surface, wherein intermediate spaces are created between the elevations, and wherein the elevations are distributed in such a way that, in the region of one of the respective contact areas, at least one of the elevations of one of the adjacent layers of the respective contact area engages into at least one of the intermediate spaces of the other adjacent layer of the same contact area.

2. The method according to claim 1,
wherein
the elevations are formed with a material that is attached to the surface of the optical fiber, in particular, by means of adhesion.

3. The method according to claim 1,
wherein
the elevations are produced by applying or distributing a dispersion with a liquid fraction and a solid fraction on the surface of the optical fiber and by desiccating or evaporating the liquid fraction of the dispersion.

4. The method according to claim 3,
wherein
the dispersion is applied or distributed on the surface of the optical fiber by the optical fiber grazing a first means that is saturated with the dispersion and/or by charging the optical fiber and the dispersion with opposite polarity, atomizing the dispersion and delivering the atomized dispersion into the vicinity of the optical fiber.

5. The method according to claim 3,
wherein
the liquid fraction of the dispersion is desiccated by routing the optical fiber with the dispersion applied thereon through at least one thermal element once or several times.

6. The method according to claim 3,
wherein
the dispersion is prepared in a water-based fashion.

7. The method according to claim 3,
wherein
the solid fraction of the dispersion is prepared in a plastic-based fashion.

8. The method according to claim 1,
wherein the optical fiber is subjected to a tensile force during the wind-up process, wherein this tensile force is dependent on the material, as well as the distribution of the dispersion and the layer to be wound.

9. The method according to claim 1,
wherein
each layer features windings and the optical fiber is turned in itself within each of the windings during the wind-up process.

10. An optical fiber spool with a self-supporting coil of an optical fiber, wherein the coil is wound up in the form of a cross-winding such that the coil features several layers of the optical fiber that lie on top of one another, wherein the optical fiber has a surface and the optical fiber spool respectively features contact areas between adjacent layers of the layers lying on top of one another,
wherein
the surface features elevations and intermediate spaces between the elevations, wherein the elevations are distributed in such a way that, in the region of one of the respective contact areas, at least one of the elevations of one of the adjacent layers of the respective contact area engages into at least one of the intermediate spaces of the other adjacent layer of the same contact area.

11. The optical fiber spool according to claim 10,
wherein
the elevations are formed with a material that attaches to the surface of the optical fiber, in particular, by means of adhesion.

12. The optical fiber spool according to claim 10,
wherein
the material that serves for forming the elevations and adheres to the surface of the optical fiber consists of the solid fraction of a dispersion.

13. The optical fiber spool according to claim 10,
wherein
each layer features windings and the optical fiber is turned in itself within each winding.

14. The optical fiber spool according to claim 10,
wherein
the windings of the optical fiber have a tension in each layer of the coil, wherein this tension is dependent on the material, as well as the distribution of the dispersion and the respective layer.

* * * * *